United States Patent [19]

Hasegawa et al.

[11] Patent Number: 4,903,149

[45] Date of Patent: Feb. 20, 1990

[54] TAPE CASSETTE LOADING SYSTEM FOR A MAGNETIC RECORDING AND REPRODUCING APPARATUS

[75] Inventors: Akira Hasegawa; Fumiyoshi Abe, both of Tokyo, Japan

[73] Assignee: Sony Corporation, Tokyo, Japan

[21] Appl. No.: 156,480

[22] Filed: Feb. 16, 1988

[30] Foreign Application Priority Data

Mar. 3, 1987 [JP] Japan .................................. 62-48574

[51] Int. Cl.$^4$ ...................... G11B 5/004; G11B 15/665
[52] U.S. Cl. ......................................... 360/69; 360/85; 360/94; 360/96.5
[58] Field of Search ....................... 360/69, 85, 9, 96.5, 360/96.6, 93, 94

[56] References Cited

U.S. PATENT DOCUMENTS

| | | | |
|---|---|---|---|
| 4,620,245 | 10/1986 | Shimizu | 360/85 |
| 4,631,607 | 12/1986 | Katsumata | 360/96.5 |
| 4,664,337 | 5/1987 | Shiratori | 242/199 |
| 4,752,845 | 6/1988 | Suzuki | 360/85 |
| 4,782,408 | 11/1988 | Inoue et al. | 360/96.5 |
| 4,788,609 | 11/1988 | Yamada et al. | 360/95 |

Primary Examiner—John H. Wolff
Assistant Examiner—David J. Severin
Attorney, Agent, or Firm—Ronald P. Kananen

[57] ABSTRACT

A tape cassette loading system for a magnetic recording and reproducing apparatus, such as a VTR, capable of operating with a plurality of kinds of tape cassettes varying in the center distance between a pair of reels contained therein comprises a reel mount shifting mechanism which discriminates between different tape cassettes and varies the center distance between a pair of reel mounts of the VTR according to the center distance between a pair of reels of a tape cassette to be used, a cassette holder capable of moving between a cassette inserting position and a cassette mounting position, a tape loading mechanism for winding the tape of a tape cassette mounted on the reel mounts around a rotary drum, driving circuits respectively for driving the reel mount shifting mechanism, the cassette holder and the tape loading mechanism, a single variable output power circuit for supplying power to the driving circuits, and a control circuit for connecting the variable output power circuit alternately to the driving circuits in a time sharing mode. The provision of a single variable output power circuit and the connection of the variable output power circuit alternately to the driving circuits eliminate accidental simultaneous actuation of the driving circuits and reduce the scale of the electrical circuit of the tape cassette loading system.

5 Claims, 13 Drawing Sheets

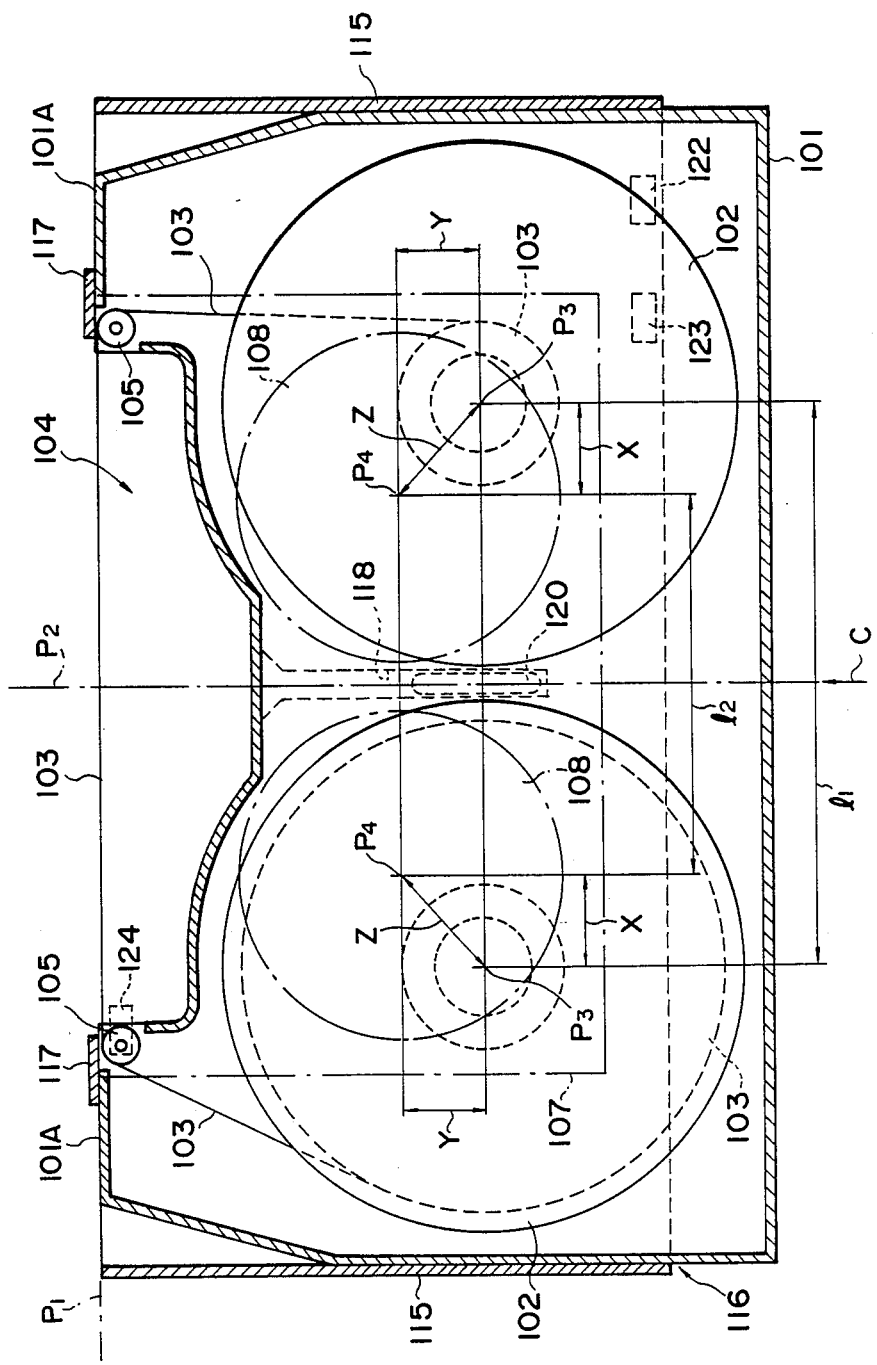

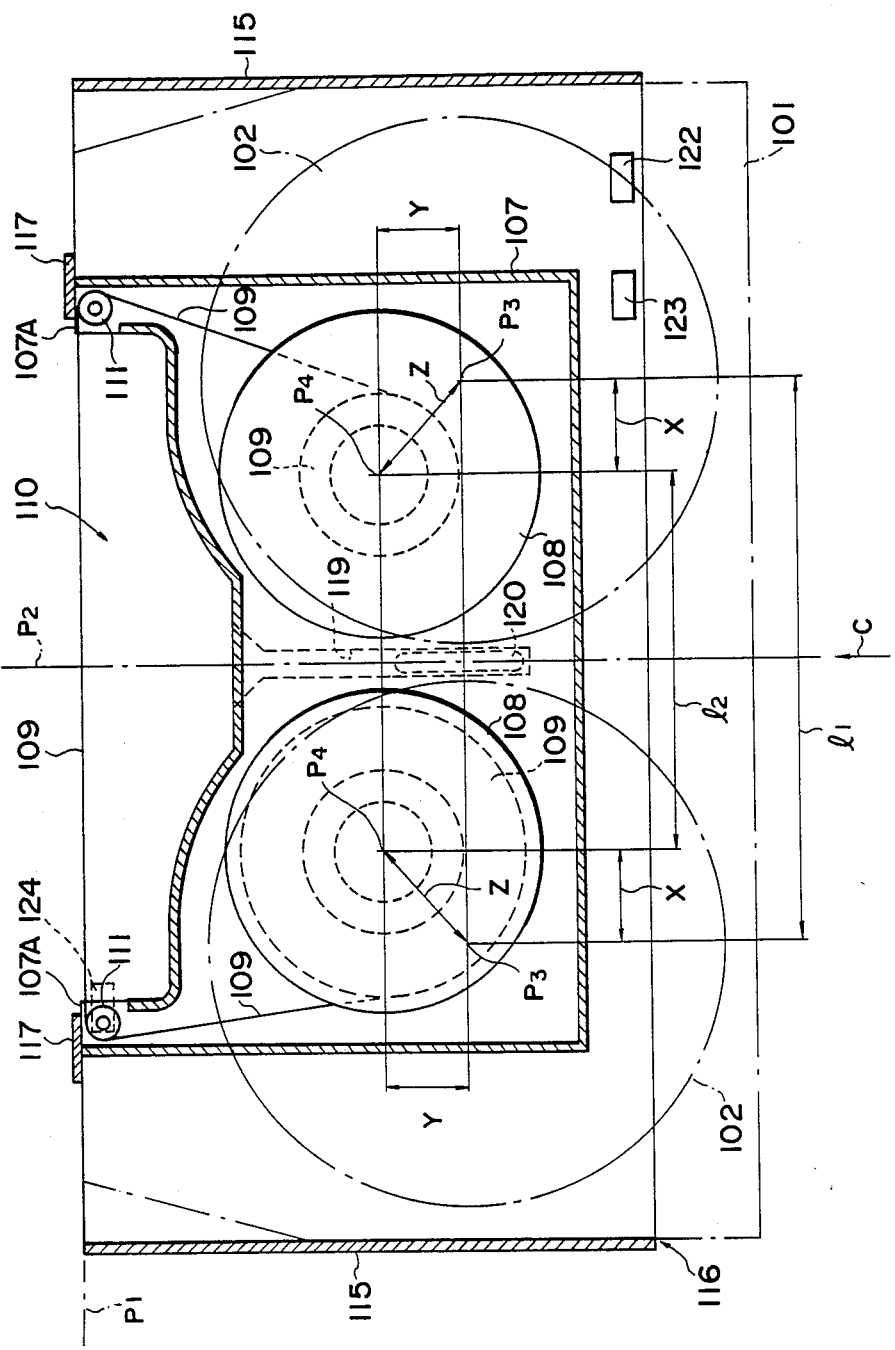

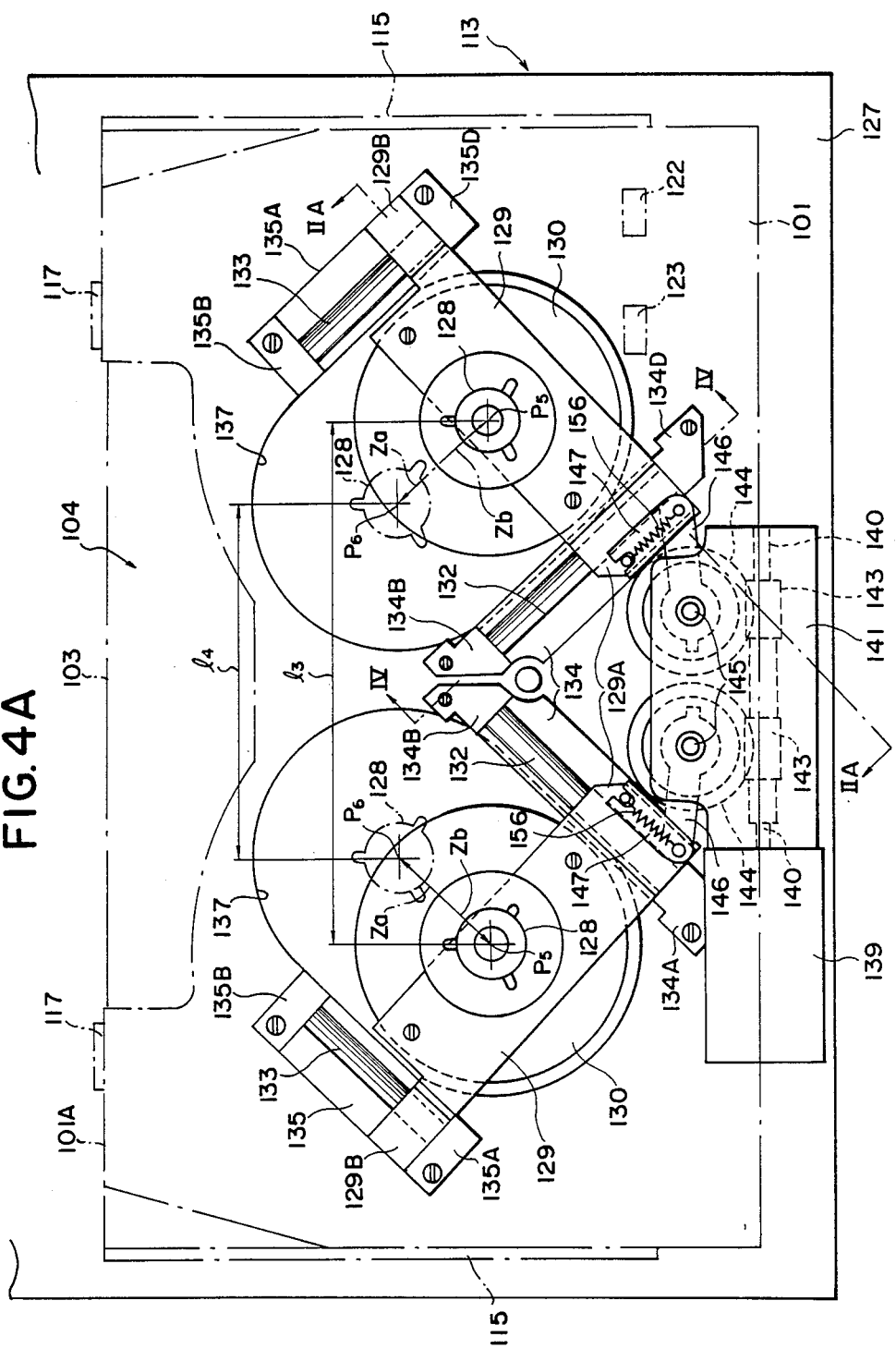

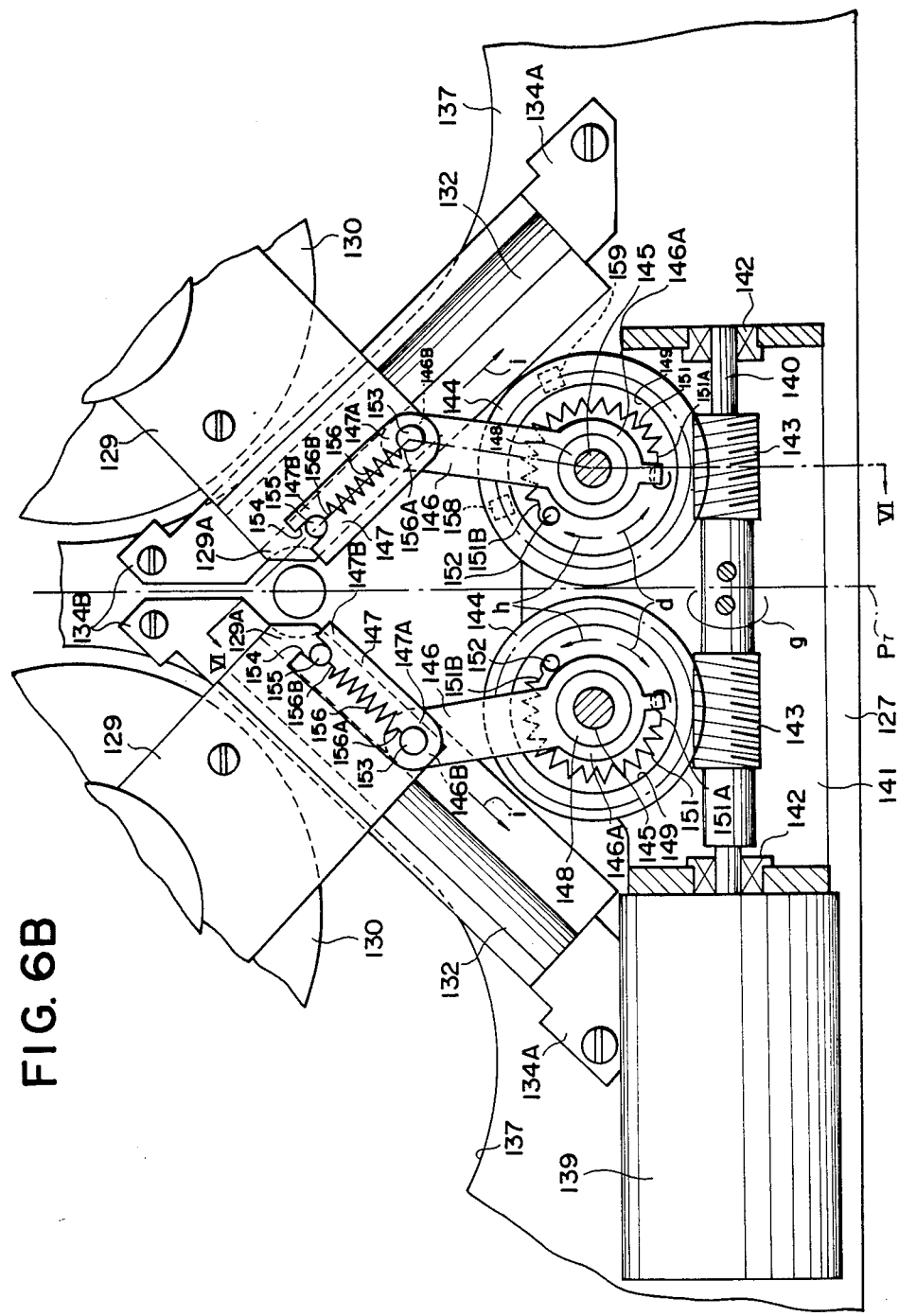

TAPE CASSETTE LOADING SYSTEM FOR A MAGNETIC RECORDING AND REPRODUCING APPARATUS

BACKGROUND OF THE INVENTION

1. Field of the Invention

The present invention relates to a tape cassette loading system for a magnetic recording and reproducing apparatus and, more particularly, to a power circuit for supplying power to the driving motors of such a tape cassette loading system.

2. Description of the Prior Art

U.S. Pat. No. 4,664,337 discloses a video tape recorder (hereinafter abbreviated to "VTR") capable of operating with tape cassettes of different sizes, namely, a comparatively large tape cassette and a comparatively small tape cassette.

Shown respectively in FIGS. 3A and 3B are a large tape cassette and a small tape cassette. As shown in FIG. 3A, the large tape cassette 101 has right and left large reels 102 each having a reel hub and a pair of flanges formed respectively at the opposite ends of the reel hub. A magnetic tape 103 is wound on the large reels 103. The large tape cassette 101 is provided with an opening 104 formed substantially in the middle portion thereof with respect to a lateral direction between the front surface 101A and a bottom surface 101B, for leading a magnetic tape 103. A pair of guide rollers 105 are provided respectively at the right and left ends of the opening 104 to guide the magnetic tape 103 for movement across the opening 104.

As shown in FIG. 3B, the small cassette 107 has right and left small reels 108 each having a reel hub and a pair of flanges formed respectively at the opposite ends of the reel hub. A magnetic tape 109 is wound on the small reels 108. The small tape cassette 107 is provided with an opening 110 formed substantially in the middle portion thereof with respect to a lateral direction between a front surface 107A and a bottom surface 107B, for loading the tape 109. A pair of guide rollers 111 are provided respectively at the right and left ends of the opening 110 to guide the magnetic tape 109 for movement across the opening 110.

The center distance $l_1$ between the large reels 102 of the large tape cassette 101 is greater than the center distance $l_2$ between the small reels 108 of the small tape cassette 107. Since the opening 104 of the large tape cassette 101, and the opening 110 of the small tape cassette 107 are respectively for loading the magnetic tapes 103 and 109, the opening 104 and 110 are the same in shape and size.

In inserting a tape cassette through the cassette inserting opening in such a VTR capable of operating with the large tape cassette 101 and the small tape cassette 107, sensors discriminate the shape of the tape cassette, and then a driving motor for shifting the reels is actuated to operate according to the shape of the tape cassette in order to position the reels properly for the tape cassette.

That is, as shown in FIGS. 3A and 3B, a cassette holder 115 for carrying the large tape cassette 101 and the small tape cassette 107 to reel mounts has an inside measure corresponding to the outside measure of the large tape cassette 101. The large tape cassette 101 or the small tape cassette 107 is inserted in the cassette holder 115 located at a cassette receiving position through the cassette inserting opening 116 of the cassette holder 115 in a direction indicated by an arrow C. The large tape cassette 101, or the small tape cassette 107, is inserted in the cassette holder 115 as far as the front surface 101A, or the front surface 107A, thereof comes into abutment with stoppers 117 provided on the bottom plate 115A of the cassette holder 115 on a side opposite the cassette inserting opening 116, and thereby the front surface 101A, or front surface 107A, is positioned at a fixed front position $P_1$. Guide grooves 118 and 119 are formed respectively in the respective bottom surfaces 101B and 107B of the large tape cassette 101 and the small tape cassette 107 along a center line passing the center position $P_2$ corresponding to the respective centers with respect to a lateral direction of the large tape cassette 101 and the small tape cassette 107. In inserting the large tape cassette 101 or the small tape cassette 107 in the cassette holder 115, the guide groove 118 or 119 engages a guide rail 120 provided on the bottom plate 115A of the cassette holder 115 so as to extend along a line extending along the cassette inserting direction and passing the center position $P_2$. Therefore, the large tape cassette 101 and the small tape cassette 107 are located in the cassette holder 115 at the same position corresponding to the center position $P_2$ with respect to the position of the respective centers with respect to a lateral direction thereof.

Cassette discriminating sensors 122 and 123 which discriminate between the large tape cassette 101 and the small tape cassette 107, and generate electric signals are provided on the bottom plate 115 near the cassette inserting opening 116 of the cassette holder 115. A perfect cassette insertion detector 124 which detects the perfect insertion of the large cassette 101 or the small tape cassette 107, in the cassette holder 115 and generates an electric signal upon the detection of the perfect insertion of the large tape cassette 101 or the small tape cassette 107 in the cassette holder 115 is provided near the stopper 117 on the bottom plate 115A. When the large tape cassette 101 is inserted in the cassette holder 115 as shown in FIG. 3A, both of the cassette discriminating sensors 122 and 123 generate electric signals. When the small tape cassette 107 is inserted in the cassette holder 115, only the cassette discriminating sensor 123 generates an electric signal. Thus, the cassette discriminating sensors 122 and 123 decide whether the large tape cassette 101 is inserted in the cassette holder 115 or whether the small tape cassette 107 is inserted in the cassette holder 115

Referring to FIGS. 4A and 4B, a pair of reel mounts 128 are provided on the chassis 127 of the VTR 113. Each reel mount 128 is moved horizontally in directions indicated by arrows $Z_a$ and $Z_b$ between positions $P_5$ and $P_6$ respectively corresponding to the center $P_3$ of each of the reels of the large tape cassette 101 and to the center $P_4$ of each of the reels of the small tape cassette 107 to adjust the center distance between the reel mount 128 to the center distance $l_3$ and $l_4$. Right and left reel motors are secured respectively to the bottom surfaces of right and left sliding saddles 129 at the respective middle positions of the sliding saddles 129. The respective output shafts of the reel motors 130 project upright respectively from the upper surfaces of the sliding saddles 129. The reel mounts 128 are attached respectively to the upper ends of the output shafts of the reel motors 130. A pair of guide rails 132 and 133 are extended on the opposite sides of each reel motor 130 along the directions indicated by the arrows $Z_a$ and $Z_b$. As shown in FIG. 5, the guide rails 132 and 133 are supported in a horizontal position respectively on substantially U-shaped supporting blocks 134 and 135 attached to the chassis 127 so as to extend respectively between the opposite ends 134A and 135B of the supporting block 134 and between the opposite ends 135A and 135B of the supporting block 135. Bearings 136 are fixed to the opposite ends 129A and 129B of each sliding saddle 129 for sliding engagement with the guide rails 132 and 133. Each sliding saddle 129 slides horizontally along the pair of guide rails 132 and 133 to move the reel mount 128 together with the reel motor 130 in the directions indicated by the arrows $Z_a$ and $Z_b$ between positions $P_5$ and $P_6$ respectively corresponding to the center $P_3$ of each of the reels of the large tape cassette 101 and to the center $P_4$ of each of the reels of the small tape cassette 107.

Referring to FIGS. 6A and 6B, a driving motor 139 is attached in a horizontal position to the chassis 127. The output shaft 140 of the driving motor 139 extends laterally in a gear box 141 attached to the chassis 127 and is supported rotatably in a pair of bearings 142 on the gear box 141. A pair of worms 143 are fixed to the output shaft 140 with a distance therebetween. The respective helix directions of the pair of worms 143 are opposite to each other. A pair of worm wheels 144 are supported fixedly respectively on a pair of upright rotary shafts 145 at the respective middle pats of the rotary shafts 145 in the gear box 141. Each worm wheel 144 is interlocked with the sliding saddle 129 with a driving arm 146 and a plate 147.

As shown in FIG. 7, each upright rotary shaft 145 is supported rotatably at the opposite ends thereof in bearings 157 on the gear box 141. A collar 148 is fitted on the upper end of the cylindrical center boss 144A of each worm wheel 144 for free rotation relative to the boss 144A. Each driving arm has one end fitted on the collar 148 for free rotation relative to the collar 148. An annular recess 149 is formed in each worm wheel 144 around the boss 144A. A lug 150 vertically extending downward from one end of each driving arm 146 is received in the annular recess 149. As shown in FIGS. 6A and 6B, an extension spring 151 is extended in a semicircular range in the annular recess 149. The extension spring has one end 151A connected to the lug 150 of the driving arm 146, and the other end connected to a stopper pin 151 planted upright in the worm wheel 144 in the annular recess 149. Thus, each driving arm 146 is biased rotatively by the extension spring 151 in a direction indicated by an arrow d seen in FIGS. 6A and 6B so as to be held in contact with the upper end of the stopper pin 152. Each plate 147 has one end 147A pivotally joined to a pivot pin 153 fixed to the other end 146B of each driving arm 146, and the other end 147B is provided with a slit 154. A pin 155 planted in one end 129A of each sliding saddle 129 is received in the slit 154 of the driving arm 147. An extension spring 156 extended along and over each plate 147 has one end 156A connected to the pivot pin 153, and the other end connected to the pin 155.

In a state where the reel mounts 128 are located respectively at positions corresponding to the respective centers $P_5$ of the reels 102 of the large tape cassette 101 as shown in FIG. 4A, the driving motor 139 is not actuated when the large tape cassette 101 is inserted in the cassette holder 115 and thereby both the cassette discriminating sensors 122 and 123 generate electric signals. Then, the large tape cassette 101 inserted in the cassette holder 115 is carried by the cassette holder 115 to a cassette loading position indicated by imaginary lines in FIG. 4A, where the reels 102 of the large tape cassette 101 are seated respectively on the reel mounts 128.

Similarly, in a state where the reel mounts 128 are located respectively at positions corresponding to the respective centers $P_6$ of the reels 108 of the small tape cassette 107 as shown in FIG. 4B, the driving motor 139 is not actuated when the small tape cassette 107 is inserted in the cassette holder 115 and thereby the cassette discriminating sensor 123 generates an electric signal. Then, the small tape cassette inserted in the cassette holder 115 is carried by the cassette holder 115 to a cassette loading position indicated by imaginary lines in FIG. 4B, where the reels 108 of the small tape cassette 107 are seated respectively on the reel mounts 128.

In a state where the reel mounts are located respectively at the positions corresponding to the respective centers $P_5$ of the reels 102 of the large tape cassette 101, the driving motor 139 is actuated when the small tape cassette 107 is inserted in the cassette holder 115 to move the reel mounts 128 horizontally respectively in the directions indicated by the arrows $Z_a$.

That is, in such a state, the output shaft 140 of the driving motor 139 rotates in a direction indicated by an arrow e in FIG. 6A. Then, since the respective helix directions of the worms 143 are opposite to each other, the worm wheels 144 are turned respectively in the opposite directions indicated by the arrows d in FIG. 6A through the same angle respectively by the worms 143. Then, each pin 152 of the worm wheel 144 tends to extend the extension spring 151, so that the driving arm 146 in contact with the pin 152 is turned in the same direction as the worm wheel 144 to push the pin 155 planted in the sliding saddle 129 through the plate 147 in a direction indicated by an arrow f in FIG. 6A.

Consequently, each sliding saddle 129 is caused to slide in the direction of the arrow $Z_a$ along the pair of guide rails 132 and 133 to shift the reel mount 128 horizontally to the position corresponding to the position $P_6$ of the center of the reel 108 of the small tape cassette 107, and thereby the center distance between the reel mounts 128 is adjusted automatically to the center distance $l_4$.

Upon the arrival of the reel mounts 128 respectively at the positions $P_6$, the end 129A of each sliding saddle 129 is brought into abutment with the end 134B of the supporting block 134 to stop the sliding plate 129 as shown in FIG. 6B, while each worm wheel 144 is turned further in the direction indicated by the arrow d, so that each extension spring 151 is extended tensely in the direction indicated by the arrow d by the pin 152. Upon the detection of a rotational position of the worm wheel 144, a rotational position detector 158 generates an electric signal to stop the driving motor 139. Since the extension springs 151 are extended tensely, the sliding saddles 129 are positioned accurately respectively at positions corresponding to the positions $P_6$ by the resilience of the extension springs 151. The worm wheels 144 are held stationary respectively by the worms 143 after the driving motor 139 has been stopped.

In a state where the reel mounts 128 are located respectively at positions corresponding to the respective positions $P_6$ of the centers of the reels 108 of the small tape cassette 107 as shown in FIG. 4B, the output shaft 140 of the driving motor 139 rotates in the reverse direction to shift the reel mounts 128 horizontally in the directions indicated by the arrow $Z_b$ when the large tape cassette 101 is inserted in the cassette holder 115 and both the cassette discriminating sensors 122 and 123 generate electric signals.

That is, in such a case, the output shaft 140 of the driving motor 139 rotates in a direction indicated by an arrow g in FIG. 6B to turn the worm wheels 144 through the same angle respectively by the worms 143 in opposite directions indicated by arrows h. Then, the pin 152 planted in each worm wheel 144 pushes the driving arm 146 to turn the driving arm 146 in the same direction as the worm wheel 144. Then, the extension spring 156 is extended by the pivot pin 153 attached to each driving arm 146 to pull the pin 155 attached to each sliding plate 129 in a direction indicated by an arrow i.

Consequently, each sliding saddle 129 is caused to slide along the pair of guide rails 132 and 133 in the direction indicated by the arrow $Z_b$, so that the reel mounts 128 are shifted horizontally respectively to positions corresponding to the position $P_5$ of the centers of the reels 102 of the large tape cassette 101, whereby the center distance between the reel mounts 128 is adjusted automatically to the center distance $l_3$.

In such a case, upon the arrival of the reel mounts 128 respectively at the positions corresponding to the positions $P_5$, and end 129A of each sliding saddle 129 is brought into abutment with the end 134B of each supporting block 134 to stop the sliding saddle 129, while the worm wheels 144 are rotated further in the direction indicated by the arrow h. Consequently, each extension spring 156 is extended tensely in the direction indicated by the arrow i by the pin 153. Upon the detection of a rotational position of the worm wheel 144, another rotational position detector 159 generates an electric signal to stop the driving motor 139. In this state, the sliding saddles 129 are held in place by the tension of the extension springs 156, and thereby the reel mounts 128 are located accurately at the positions corresponding to the position $P_5$ corresponding to the respective centers of the reels 102 of the large tape cassette 101. In this state, the worm wheels 144 are held stationary respectively by the worms 143.

Thus, in such a VTR capable of operating with both the large tape cassette 101 and the small tape cassette 107, a cassette mounting mechanism is actuated to mount the large tape cassette 101 or the small tape cassette 107 on the reel mounts 128 after the reel mounts 128 have been shifted to positions corresponding to the size of a tape cassette inserted in the cassette holder 115. Then, a tape loading mechanism is actuated to wind the magnetic tape 103 or 109 around the rotary drum. The cassette mounting mechanism is described in detail, for example, in U.S. Pat. No. 4,631,607. The tape loading mechanism is described in detail, for example in U.S. Pat. No. 4,620.245.

FIG. 8 shows a cassette mounting mechanism for shifting the cassette holder 115 to mount a tape cassette inserted in the cassette holder 115, namely, the large tape cassette 101 of the small tape cassette 107, on the reel mounts 128.

Upon the perfect insertion of the large tape cassette 101 or the small tape cassette 107 in the cassette holder 115, the perfect cassette insertion detector 124 generates an electric signal to actuate the driving motor, not shown, of a lifting mechanism in 9order to shift the cassette holder 115 downward in the direction indicated by the arrow a from the cassette inserting position to the cassette mounting position so that the reels 102 (or the reels 108) of the large tape cassette 101 (or the small tape cassette 107) engage the pair of reel mounts 128, respectively.

FIG. 9 shows the tape loading mechanism. As shown in FIG. 10, a pair of substantially J-shaped guide rails 210 and 211 are disposed so as to receive a rotary drum 205 therebetween. A curved first guide slit 212 is formed substantially in the central portion of each of the guide rails 210 and 211, and a second guide slit 214 is formed outside the first guide slit 212. A positioning pin 213 is planted in one end of each of the guide rails 210 and 211.

Sliding members 220 and 221 are provided for sliding movement respectively on the pair of guide rails 210 and 211. Each of the sliding members 220 and 221 is provided with an upright tape guide 230 and an inclined tape guide 231. As shown in FIG. 11, the sliding member 220 (the sliding member 221) is formed in the shape of a block, a first guide pin 223 to be received in the first guide slit 212 of the guide rail 210 (the guide rail 211) is attached to the lower surface of the sliding member 220 (the sliding member 221) at the substantially central portion of the same, and a second guide pin 224 to be received in the second guide slit 214 of the guide rail 210 (the guide rail 211) is attached to the lower surface of the sliding member 220 (the sliding member 221) at the outer corner of the rear end of the same. A U-shaped positioning recess 222 which engages the positioning pin 213 is formed in the front end of each of the sliding members 220 and 221. Each of the sliding members 220 and 221 is located at the front limit position with the positioning recess in engagement with the positioning pin 213. In FIG. 9, the respective front limit positions and respective back limit positions of the sliding members 220 and 221 are indicated by full lines and by broken lines, respectively. The upright tape guides 230 are set upright on the upper surface of the sliding members 220 and 221, respectively. The inclined tape guides 231 extend at an inclination substantially the same as that of the rotary drum 205.

The sliding members 220 and 221 are driven by a driving mechanism 235. Referring to FIGS. 9 and 12, the driving mechanism 235 comprises an upper ring gear 236 disposed below the rotary drum 205, a lower ring gear 237 disposed below the upper ring gear 236 and adapted to be driven in a direction opposite the direction of rotation of the upper ring gear 236, a connecting plate 240 having one end connected to the upper ring gear 236 by a spring 238, and the other end provided with a hole 239 receiving the first guide pin 223 of the sliding member 220, another connecting plate 240 having one end connected to the lower ring gear 137 by another spring 238, and the other end provided with another hole 239 receiving the first guide pin 223 of the sliding member 221, a worm 241, a worm wheel 242 engaging the worm 241, a main driving gear 234 coaxially joined to the worm wheel 242, an auxiliary driving gear 244 engaging the main driving gear 234 and the ring gear 236, an intermediate gear 245 engaging the main driving gear 245 and the ring gear 237, and a motor 247 for driving the ring gears 2367 and 237 reversibly respectively in directions opposite to each other. As the ring gears 236 and 237 are rotated reversibly respectively in opposite directions, the first guide pins 223 are moved along the first guide slits 212 of the rails 210 and 211 through the spring 238 and the connecting pins 240, respectively, while the second guide pins 224 are moved along the second guide slits 224 to slide the sliding members 220 and 221 along the guide rails 210 and 211, respectively.

In FIG. 9, full lines indicate a tape operating system in a state after the completion of tape loading operation. The tape operating system comprises tape guides 206A, 206B and 206C, a full-width erasing head 207, tape guides 208A, 208B and 208C, a sound head 209A, A CTL head 209B and a capstan 209C, which are arranged sequentially from the tape feeding side to the tape winding side. Preparatory loading of the tape on the tape guides on the tape feeding and tape winding sides is carried out by a pair of subloading mechanisms 250A and 250B.

The subloading mechanism 250A on the tape feeding side has a swing arm 253A pivotally supported on a pivot shaft 251A for swing motion and rotatably supporting a roller 252A on the free end thereof, and a crank arm 256A having one end rotatably supporting a worm wheel 254A, and the other end pivotally connected through a link plate 255A to the middle part of the swing arm 253A.

The subloading mechanism 250B on the tape winding side has a swing arm 253B having one end pivotally supported on a pivot shaft 251B for swing motion and the other end rotatably supporting a pinch roller 252B, and a crank arm 256B having one end rotatably supporting a worm wheel 254B, and the other end pivotally connected through a link plate 255B to the middle part of the swing arm 253B.

The respective worm wheels 254A and 254B of the subloading mechanisms 250A and 250B engage worms 257A and 257B mounted on a driving shaft 257 extending in front of the cassette mounting position in parallel to the tape cassette, namely, the large tape cassette 101 or the small tape cassette 107, at the opposite ends of the same. As shown in FIG. 12, the driving shaft 257 is rotated in the normal and reverse directions by a gear train having a gear 258A engaging the lower ring gear 237, gears 258B, 258C and 258D, and helical gears 259A and 259B.

When the tape cassette 101 or 107 is lowered onto the reel mounts 128, the upright tape guides 230 and inclined tape guides 231 of the sliding members 220 and 221 staying at the back limit positions are located inside the tape 103 or 109 contained in the large tape cassette 101 or the small tape cassette 107. In this state, the sliding members 220 and 221 are moved along the first guide grooves 212 and the second guide grooves 214 of the guides 10 and 11 by the driving mechanism 235 to the respective front limit positions. As the sliding members 220 and 221 slide toward the front limit position, the upright tape guides 230 of the sliding members 220 and 221 engage the tape 103 or 109 of the tape cassette 101 or 107 to pull out the tape 103 or 109 from the tape cassette 101 or 107 and to extend the tape 103 or 109 gradually along the outer circumference of the rotary drum 205.

Finally, the sliding members 220 and 221 arrive at the respective front limit positions to load the tape 103 or 109 in a predetermined helical position on the circumference of the rotary drum 205.

The foregoing VTR capable of operating with both the large tape cassette 101 and the small tape cassette 107 is provided with a tape cassette loading system including a plurality of driving motors, which are actuated sequentially in a period from the insertion of the tape cassette in the cassette holder 115 to the completion of tape loading operation. That is, the driving motor for shifting the reel mounts 128, the driving motor for shifting the cassette holder 115, and the driving motor for tape loading operation are actuated sequentially in that order. This conventional tape cassette loading system also has separate power circuits and control circuits individually for those driving motors, which entails various problems as follows.

First, provision of separate power circuits individually for the driving motors increases the size of the tape loading system, hence that of the VTR, and the increases the size of the VTR.

Secondly, although the driving motors need to be actuated sequentially for the series of steps of tape loading operation and must not be actuated simultaneously, it is possible that the driving motors are actuated simultaneously due to the malfunction of the separate power circuits, which may cause damages in the tape cassette.

Thirdly, since provision of separate power circuits and control circuits individually for the driving motors makes the constitution of the tape loading system, hence that of the VTR, complex and increases the cost of the VTR, in some conventional VTRs, control circuits for driving motors which need not be controlled very strictly for operation among the plurality of driving motors are omitted. In such a case, the motors which are not controlled by control circuits are unable to operate stably and accurately.

SUMMARY OF THE INVENTION

Accordingly, it is an object of the present invention to provide a tape cassette loading system for a magnetic recording and reproducing apparatus, having a simple circuit constitution and capable of reducing the cost of the magnetic recording and reproducing apparatus.

It is another object of the present invention to provide a tape cassette loading system for a magnetic recording and reproducing apparatus, capable of preventing the simultaneous actuation of a plurality of driving motors.

It is a further object of the present invention to provide a tape cassette loading system for a magnetic recording and reproducing apparatus, capable of highly accurately controlling a plurality of driving motors.

According to one aspect of the present invention, there is provided a tape cassette loading system for a magnetic recording and reproducing apparatus comprising: a cassette holder for holding a tape cassette, capable of being moved between a cassette inserting position where a tape cassette is inserted therein and a cassette mounting position where a tape cassette is mounted on reel mounts; tape loading means for pulling out a tape from a tape cassette mounted on the reel mounts and winding the tape around a rotary drum; cassette holder driving means for driving the cassette holder; tape loading means driving means for driving the tape loading means; a single power circuit for supplying power to the cassette holder driving means and the tape loading means driving means; and control means for connecting the power source alternately to the cassette holder driving means and to the tape loading means driving means in a time sharing mode.

According to another aspect of the present invention, there is provided a tape cassette loading system for a magnetic recording and reproducing apparatus capable of operating with a plurality of kinds of tape cassettes varying in the center distance between a pair of reels contained therein for winding a tape, comprising: reel mount shifting means which discriminates between a plurality of kinds of tape cassettes and varies the center distance between a pair of reel mounts according to the center distance between a pair of reels of a tape cassette to be used; a cassette holder for holding a tape cassette, capable of being moved between a cassette inserting position where a tape cassette is inserted therein and a cassette mounting position where a tape cassette is mounted on the reel mounts; tape loading means for pulling out a tape from a tape cassette mounted on the reel mounts and winding the tape around a rotary drum; reel mount shifting means driving means for driving the reel mount shifting means; cassette holder driving means for driving the cassette holder; tape loading means driving means for driving the tape loading means; a single power circuit for supplying power to the reel shifting means driving means, the cassette holder driving means and the tape loading means driving means; and control means for connecting the power circuit alternately to the reel mount shifting means driving means, to the cassette holder driving means and to the tape loading means driving means in a time sharing mode.

According to the present invention, a series of steps of tape cassette loading operation is carried out by giving control signals sequentially to a plurality of motor driving circuits respectively for connecting the corresponding driving motors to a single power source so that the driving motors are actuated sequentially. Accordingly, the plurality of driving motors are never actuated simultaneously even if the motor driving circuits malfunction.

BRIEF DESCRIPTION OF THE DRAWINGS

The above and other objects, features and advantages of the present invention will become fully apparent from the following description taken in conjunction with the accompanying drawings, in which:

FIGS. 3A and 3B are sectional plan views of assistance in explaining the disposition of a relatively large tape cassette having a pair of relatively large reels and that of a relatively small tape cassette having a pair of relatively small reels, in a cassette holder;

FIGS. 4A and 4B are plan views of assistance in explaining reel mount shifting operations;

FIGS. 6A and 6B are plan views of assistance in explaining a reel mount shifting mechanism incorporated into a tape cassette loading system, in a preferred embodiment, according to the present invention;

DESCRIPTION OF THE PREFERRED EMBODIMENT

The present invention will be described hereinafter with reference to the accompanying drawings as applied to a tape cassette loading system for a recording and reproducing apparatus, namely, a video tape recorder (hereinafter abbreviated to "VTR"), capable operating with tape cassette of different sizes, such as in this case, a relatively large tape cassette (hereinafter referred to as "large tape cassette") and a relatively small tape cassette (hereinafter referred to as "small tape cassette").

The mechanical constitution of the tape cassette loading system of the present invention is substantially the same as that of the foregoing conventional tape cassette loading system, and hence the description of mechanisms corresponding to those previously described with reference to the foregoing conventional tape loading system will be omitted.

In this VTR, during a tape cassette loading operation from the insertion of a tape cassette in the VTR to the completion of tape loading, motors respectively for shifting the reel mounts, moving a cassette holder and for loading a tape on a rotary drum are operated sequentially and are not operated simultaneously.

Figure 1:
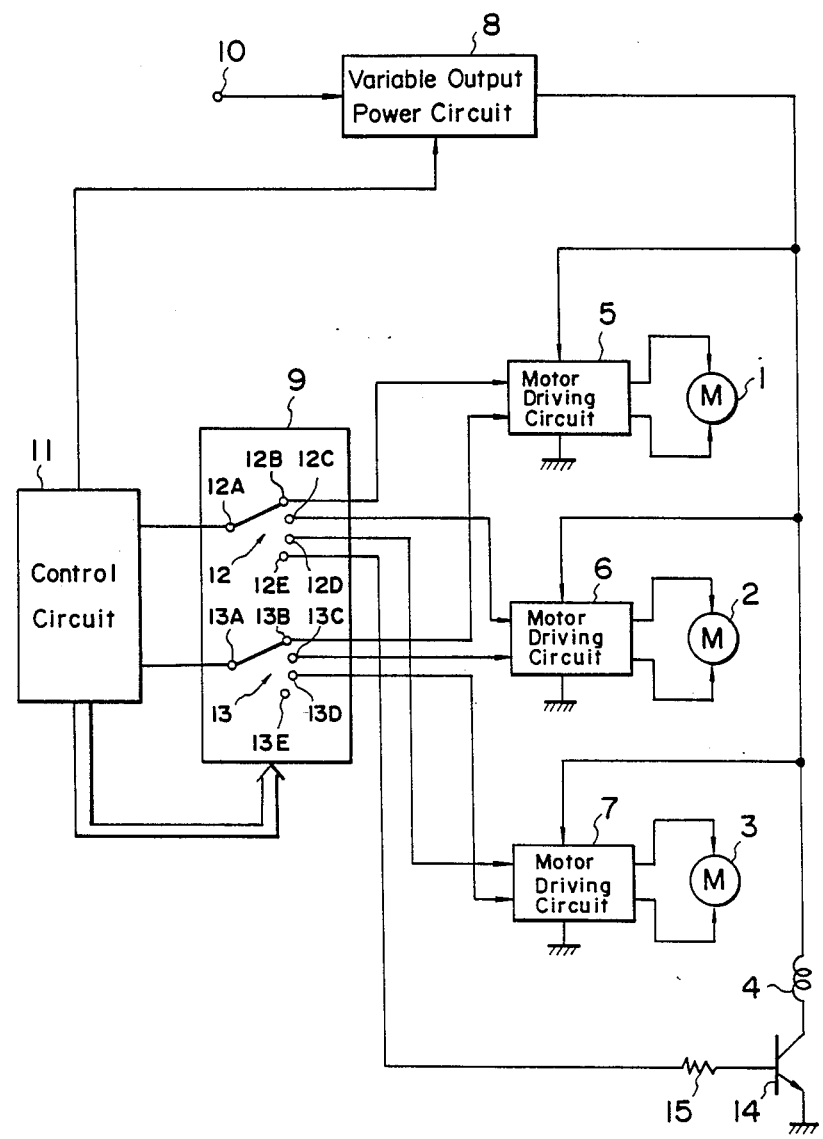
FIG. 1 is a block diagram of an electric circuit incorporated in a tape cassette loading system, in a preferred embodiment, according to the present invention.

Referring to FIG. 1, there are shown a reel mount shifting motor 1, a cassette holder moving motor 2, a tape loading motor 3, a pinch roller shifting solenoid 4 for pressing a pinch roller against a capstan, a motor driving circuit 5 for driving the reel mount shifting motor 1, a motor driving circuit 6 for driving the cassette holder moving motor 2, a motor driving circuit 7 for driving the tape loading motor 3, a variable output power circuit 8 having an input terminal 10, a decoder 9 for controlling the motor driving circuits 5, 6 and 7, a control circuit 11 for applying selection signals to the decoder 9, and a transistor 14 having its base in circuit with a resistor 15 for controlling the pinch roller shifting solenoid 4.

The motor driving circuits 5, 6 and 7 drive the motors 1, 2 and 3 in the normal direction or in the reverse direction or stop the motors 1, 2 and 3, respectively. The motor driving circuits 5, 6 and 7 are substantially the same in constitution. The variable output power circuit 8 supplies power through the motor driving circuits 5, 6 and 7 to the reel mount shifting motor 1, the cassette holder moving motor 2 and the tape loading motor 3. The power input terminal 10 of the variable output power circuit 8 is connected to a power source. The control circuit 11 applies control signals to the variable output power circuit 8 to control the output power level of the variable output power circuit 8, so that the levels of power respectively for the reel mount shifting motor 1, the cassette holder moving motor 2 and the tape loading motor 3 are controlled properly.

Figure 2A:
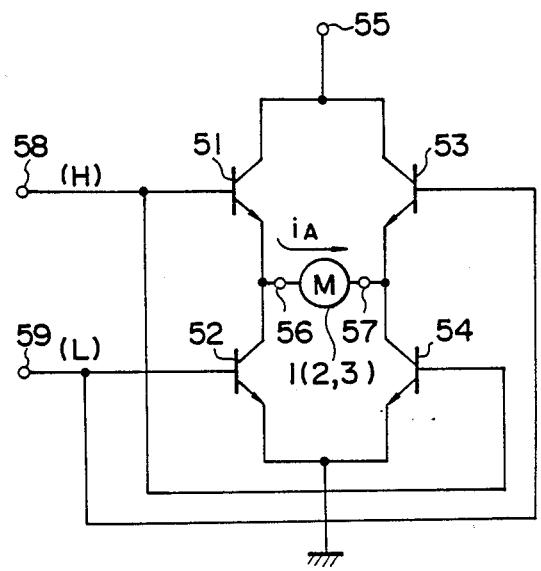
FIGS. 2A and 2B are circuit diagrams showing a motor driving circuit of the electric circuit of FIG. 1 respectively in two different operating modes.
Figure 2B:
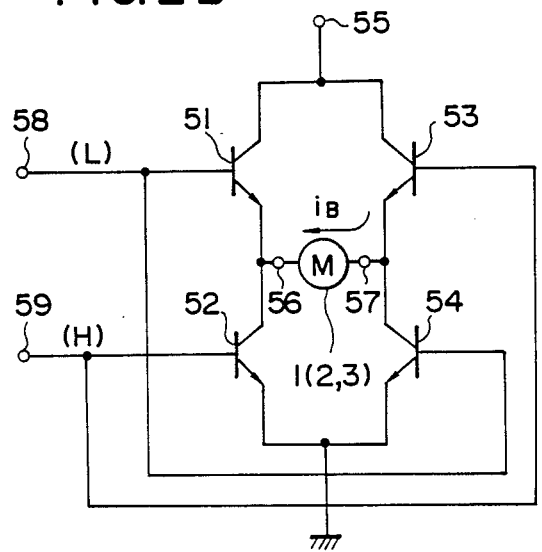
Figure 4B:
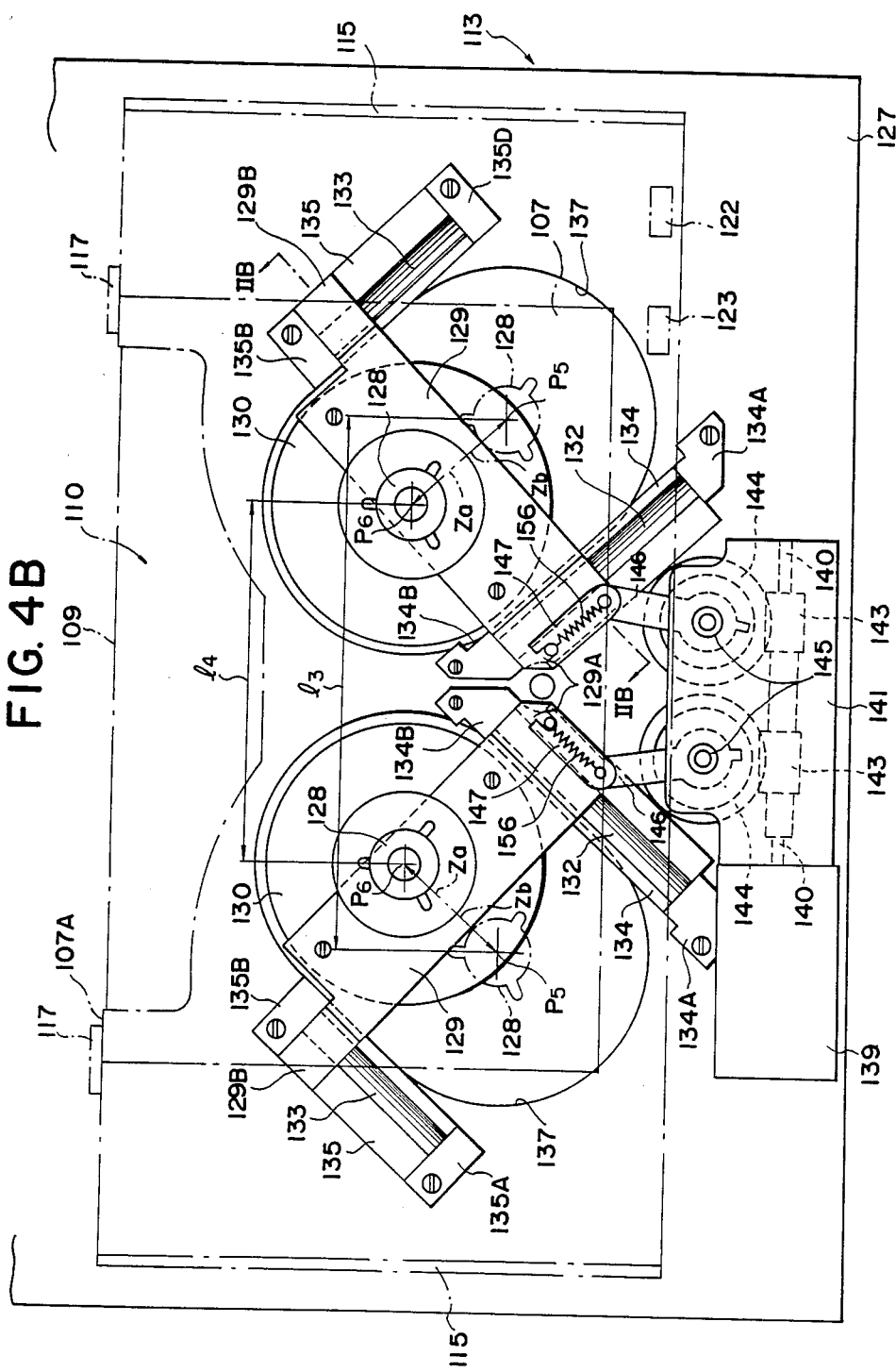
Figure 5:
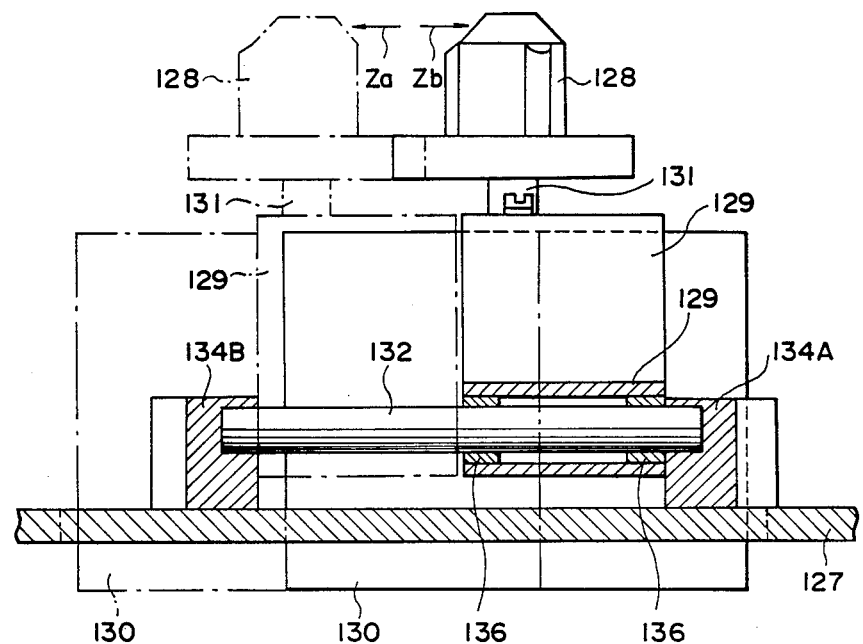
FIG. 5 is a sectional view taken on line IV—IV in FIG. 4A.
Figure 7:
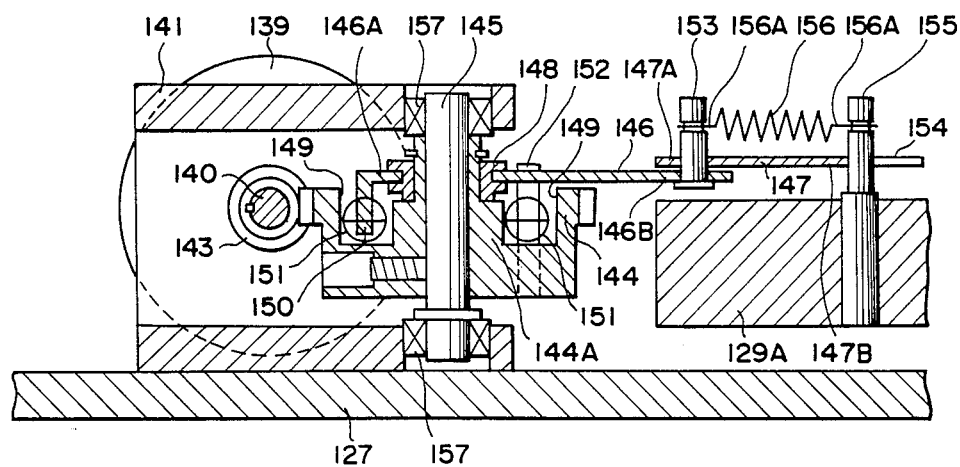
FIG. 7 is a sectional view taken on line VI—VI in FIG. 6B.
Figure 6A:
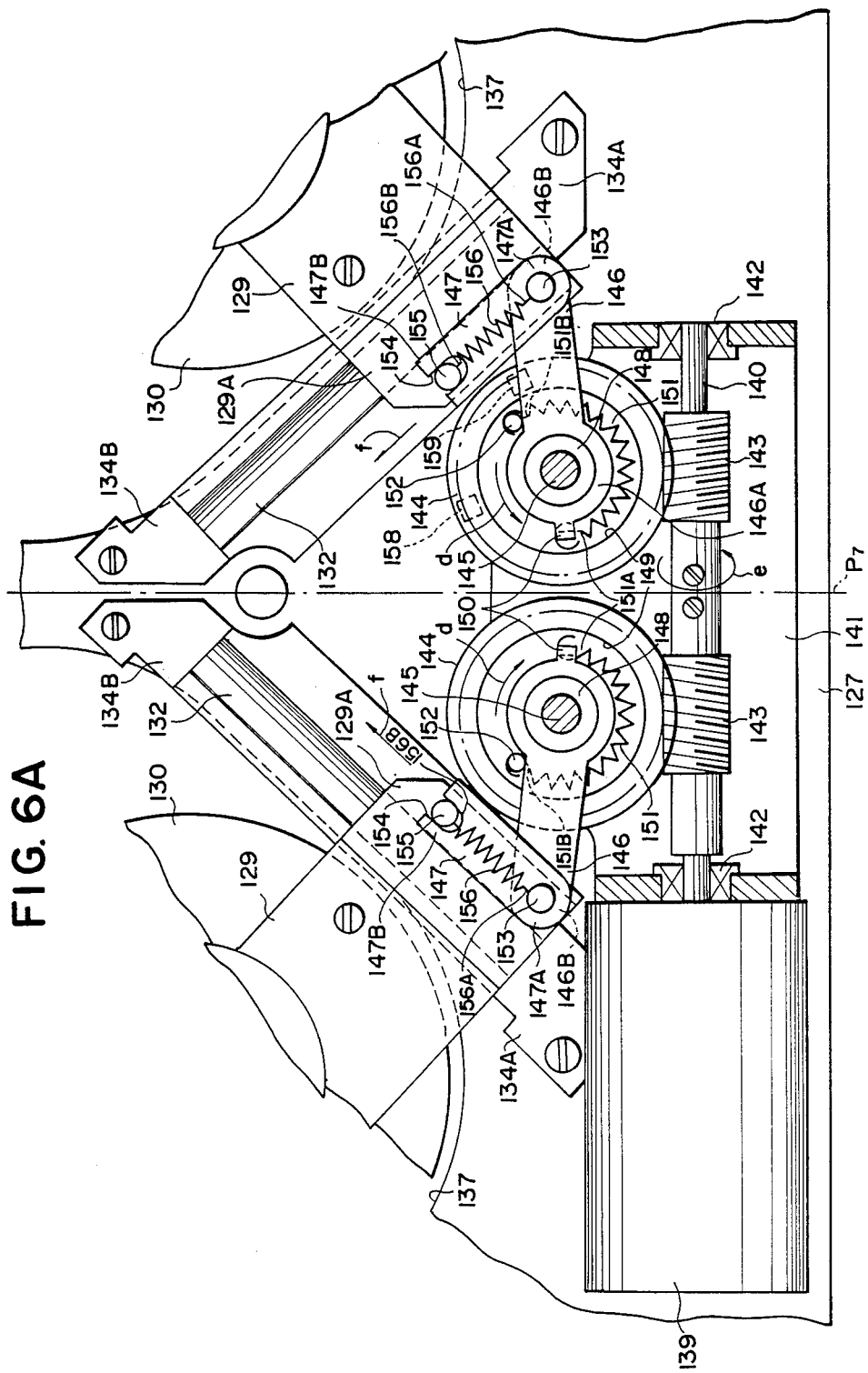
Figure 8:
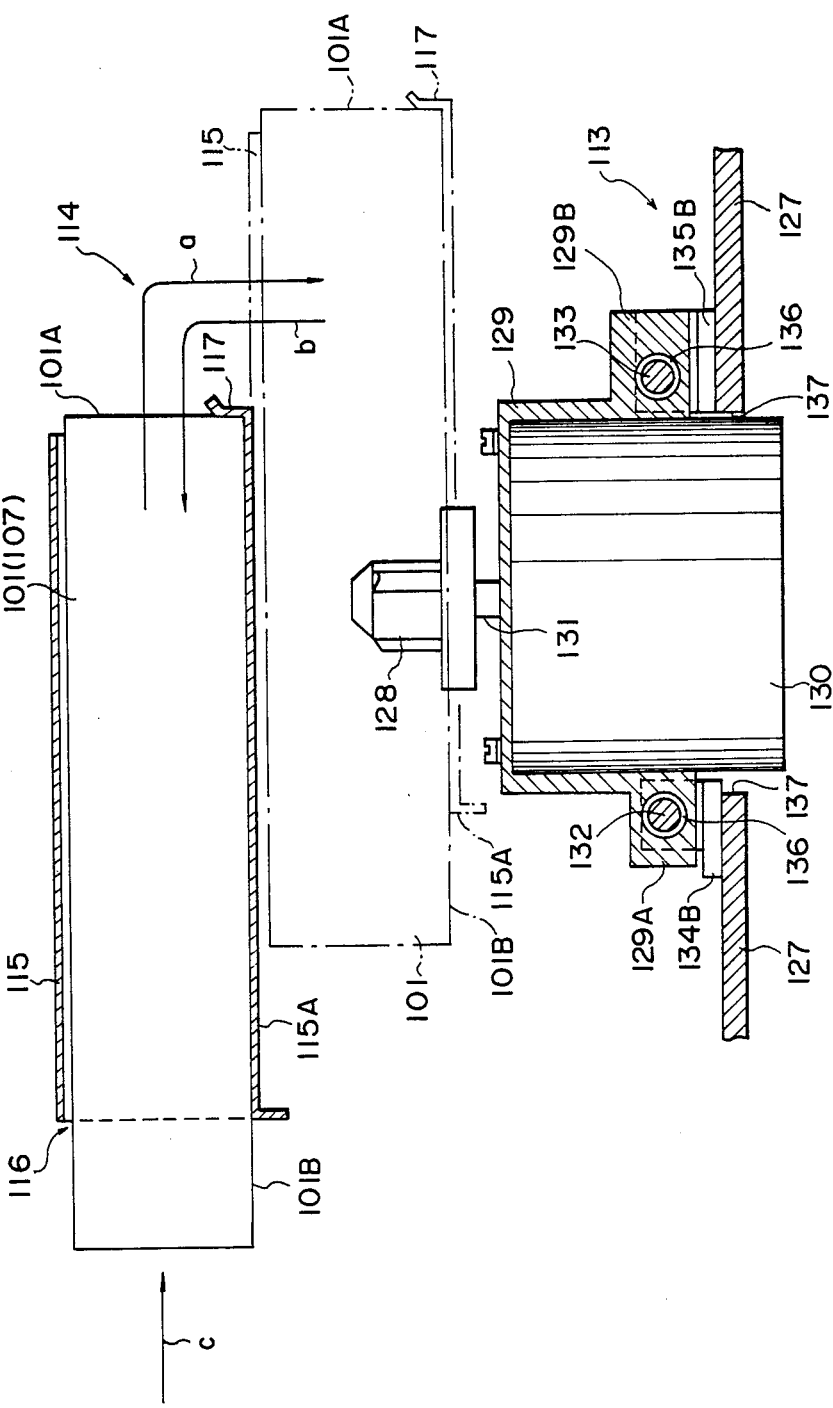
FIG. 8 is a sectional view of assistance in explaining a cassette holder moving operation.
Figure 9:
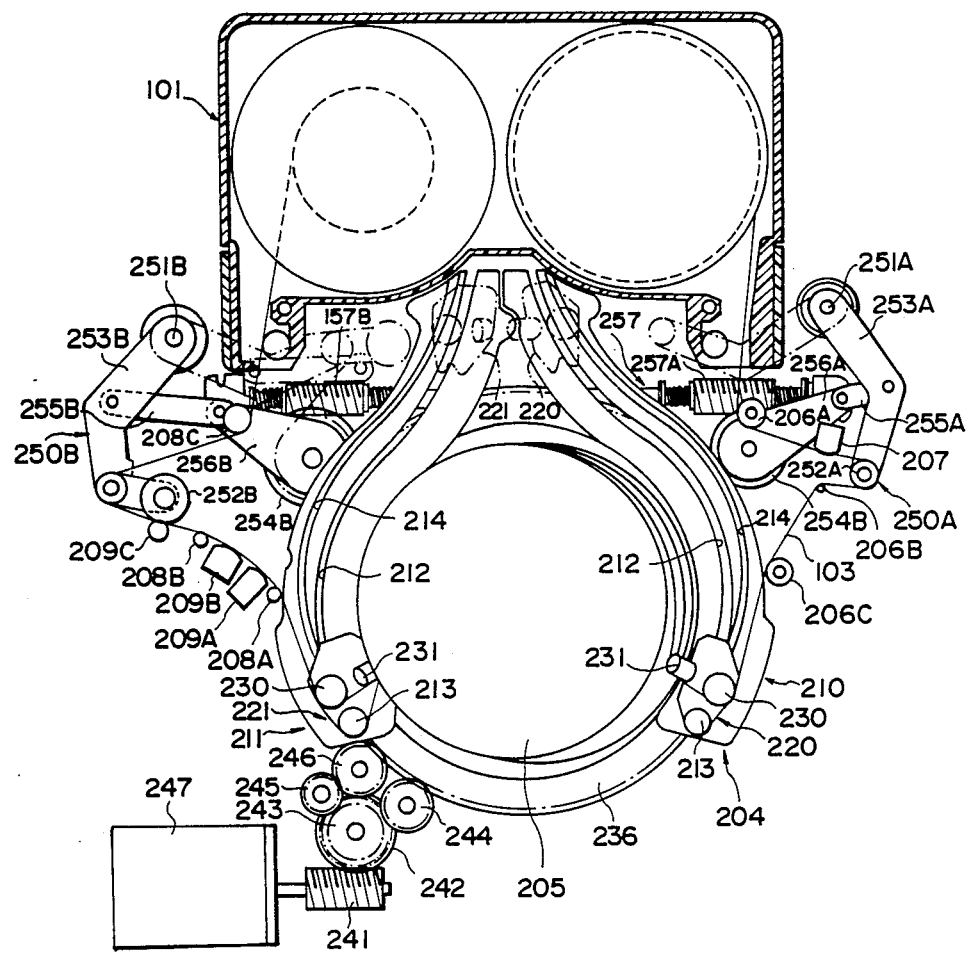
FIG. 9 is a plan view of assistance in explaining a tape loading mechanism incorporated into a tape cassette loading system, in a preferred embodiment, according to the present invention.
Figure 10:
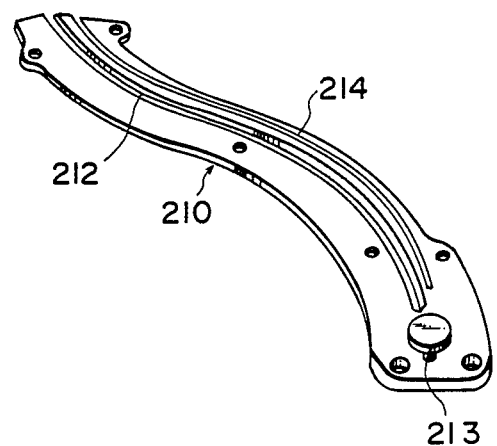
FIG. 10 is a perspective view of a guide rail of the tape loading mechanism of FIG. 9.
Figure 11:
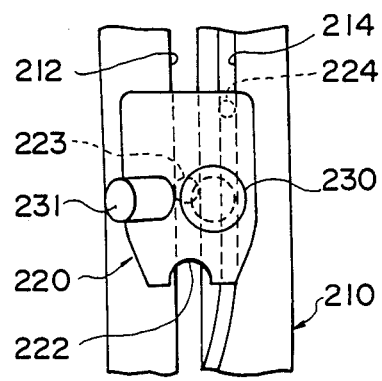
FIG. 11 is a plan view of a sliding member of the tape loading mechanism of FIG. 9.
Figure 12:
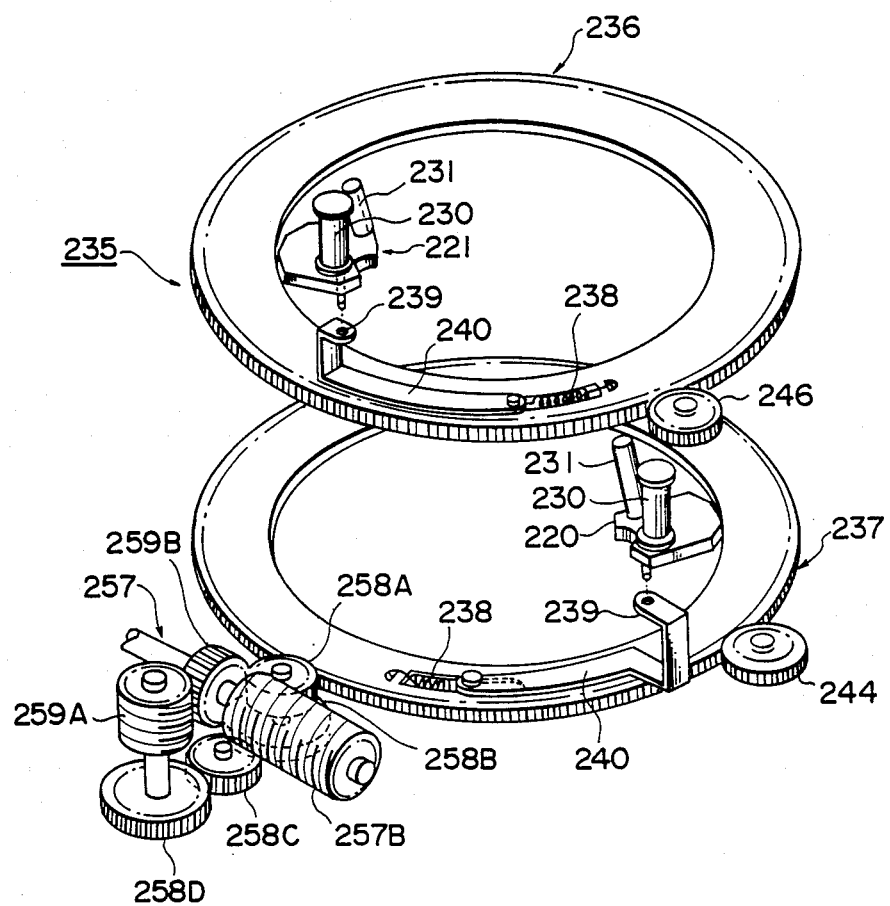
FIG. 12 is a perspective view of a tape loading mechanism driving mechanism for driving the tape loading mechanism of FIG. 9.

Referring to FIGS. 2A and 2B typically showing the constitution of the motor driving circuits 5, 6 and 7, the respective collectors of npn type transistors 51 and 53 are interconnected, and the junction of lines interconnecting the collectors of the transistors 51 and 53 is connected to a power input terminal 55. The respective emitters of npn type transistors 52 and 54 are interconnected, and the junction of lines interconnecting the emitters of the transistors 52 and 54 is grounded. The emitter of the transistor 51 and the collector of the transistor 52 are interconnected, and the junction of lines interconnecting the emitter of the transistor 51 and the collector of the transistor 52 is connected to an output terminal 56. The emitter of the transistor 53 and the collector of the transistor 54 are interconnected, and the junction of lines interconnecting the emitter of the transistor 53 and the collector of the transistor 54 is connected to an output terminal 57. The respective bases of the transistors 51 and 54 are connected to an input terminal 58. The respective bases of the transistors 52 and 53 are connected to an input terminal 59.

The output power of the variable output power circuit 8 is applied to the power input terminal 55. Control signals for driving the motors in the normal direction and in the reverse direction and for stopping the associated motor are applied through the decoder 9 to the input terminals 58 and 59. The output terminals 56 and 57 are connected to the associated motor among the motors 1, 2 and 3.

When control signals of a low level are applied to the input terminals 58 and 59, all the transistors 51, 52 and 54 are turned off. Consequently, the associated motor among the motors 1, 2 and 3 is stopped. When a control signal of high level is applied to the input terminal 58 while a control signal of low level is applied to the input terminal 59, the transistors 51 and 54 are turned on while the transistors 52 and 53 are turned off. Consequently, as shown in FIG. 2A, a current $i_A$ is supplied to the associated motor to drive the same in the normal direction. When a control signal of a high level is applied to the input terminal 59 while a control signal of a low level is applied to the input terminal 58, the transistors 52 and 53 are turned on while the transistors 51 and 54 are turned off. Consequently, as shown in FIG. 2B, a current $i_B$ reverse to the current $i_A$ is supplied to the associated motor to drive the same in the reverse direction.

Referring to FIG. 1, the decoder 9 applies control signals corresponding to control signals provided by the control circuit 11 selectively to the motor driving circuits 5, 6 and 7 and the transistor 14. The control signals are those for driving the motors 1, 2 and 3 in the normal direction and in the reverse direction, for stopping the motors 1, 2 and 3, for energizing the solenoid 4, and for de-energizing the solenoid 4. The decoder 9 comprises two switching circuits 12 and 13, which are controlled by the control signals applied thereto by the control circuit 11. During the cassette loading operation from the insertion of a tape cassette in the cassette holder 115 to the completion of the tape loading operation or further, for example, to the engagement of the pinch roller with the capstan in a reproducing operation, the switching circuits 12 and 13 are controlled so as to switch the electrical connections sequentially.

That is, upon the insertion of a tape cassette in the cassette holder 115, the terminals 12A and 12B of the switching circuit 12 are connected, and the terminals 13A and 13B of the switching circuit 13 are connected. Consequently, a control signal directing the motor to operate for normal revolution or reverse revolution or to stop provided by the control circuit 11 is applied to the motor driving circuit 5, and no control signal is applied to the motor driving circuits 6 and 7 and the transistor 14. Accordingly, in this state, only the reel mount shifting motor 1 is controlled. Thus, the reel mount shifting motor 1 is driven according to the size of the tape cassette inserted in the cassette holder 115 to set the reel mounts 128 properly according to the size of the tape cassette.

After the reel mounts 128 have thus been set properly, the terminals 12A and 12C of the switching circuit 12 are connected and the terminals 13A and 13C of the switching circuit 13 are connected. Consequently, a control signal directing the motor to operate for normal revolution or reverse revolution or to stop provided by the control circuit 12 is applied to the motor driving circuit 6, and no control signal is applied to the motor driving circuits 5 and 7 and the transistor 14. Accordingly, in this state, only the cassette holder moving motor 2 is controlled. Thus, the cassette holder 115 is lowered to mount the tape cassette on the reel mounts 128.

After the tape cassette has been mounted on the reel mounts 128, the terminals 12A and 12D of the switching circuit 12 are connected, and the terminals 13A and 13D of the switching circuit 13 are connected. Consequently, a control signal directing the motor to operate for normal or reverse revolution or to stop provided by the control circuit 11 is applied to the motor driving circuit 7, and no control signal is applied to the motor driving circuits 5 and 6 and the transistor 14. Accordingly, in this state, only the tape loading motor 3 is controlled. Thus, the tape of the tape cassette is wound around the rotary drum to complete the cassette loading operation.

Upon the completion of the cassette loading operation, the terminals 12A and 12E of the switching circuit 12 are connected, and the terminals 13A and 13E of the switching circuit 13 are connected. Consequently, only a solenoid control signal provided by the control circuit 11 is applied through a resistor 15 to the transistor 14, and no control signal is applied to the motor driving circuits 5, 6 and 7. Thus, in the reproducing operation, for example, the solenoid 4 is energized to press the pinch roller against the capstan.

Simultaneously with the control of the switching circuits 12 and 13 for switching the electrical connections, the control signal applied to the variable output power circuit 8 is altered properly.

Thus, the control signal corresponding to those provided by the control circuit 11 is applied selectively to the motor driving circuits 5, 6 and 7 and the transistor 14 in a time sharing mode by the switching circuits 12 and 13 of the decoder 9. Accordingly, the motors 1, 2 and 3 and the solenoid 4 are basically never actuated simultaneously.

As is apparent from the foregoing description, according to the present invention, only the variable output power circuit 8 is provided for the plurality of motors 1, 2 and 3, and the control signals are applied selectively in a time sharing mode to the motor driving circuits 5, 6 and 7 through the switching operation of the switching circuits 12 and 13 during the cassette loading operation. Therefore, only one of the motors 1, 2 and 3 is controlled for operation at any moment during the cassette loading operation. Accordingly, a plurality of motors among those motors are never driven simultaneously due to malfunction of the electrical circuits.

Furthermore, since the present invention employs only a single variable output power circuit 8 for supplying power to the plurality of motors 1, 2 and 3 in a time sharing mode, the electrical circuit of the tape cassette loading system can be found in a reduced scale and at a reduced cost.

Although the invention has been described in its preferred form with a certain degree of particularity, obviously many changes and variations are possible therein. It is therefore to be understood that the present invention may be practiced otherwise than specifically described herein without departing from the scope and spirit thereof.

What is claimed is:

1. A tape cassette loading system for a magnetic recording and reproducing apparatus capable of operating with a plurality of kinds of tape cassettes differing from each other in the center distance between a pair of reels contained therein for carrying a tape, comprising:
    reel mount shifting means which discriminates between a plurality of kinds of tape cassette and varies the center distance between a pair of reel mounts according to the center distance between a pair of reels of a tape cassette to be used;
    a cassette holder for holding a tape cassette, capable of being moved between a cassette inserting position where a tape cassette is inserted therein and a cassette mounting position where a tape cassette is mounted on the reel mounts;
    tape loading means for pulling out a tape from a tape cassette mounted on the reel mounts and winding the tape around a rotary drum;
    reel mount shifting means driving means for driving the reel mount shifting means;
    cassette holder driving means for driving the cassette holder;
    tape loading means driving means for driving the tape loading means;
    a single power circuit for supplying power to the reel mount shifting means driving means, to the cassette holder driving means and to the tape loading means driving means; and
    control means for connecting the power circuit sequentially to the reel mount shifting means driving means, to the cassette holder driving means and to the tape loading means driving means in a time sharing mode.

2. A tape cassette loading system for a magnetic recording and reproducing apparatus, according to claim 1, further comprising:
    a pinch roller for pressing the tape around the rotary drum against a capstan; and
    pinch roller pressing means for pressing the pinch roller against the capstan;
    wherein said power circuit supplies power also to the pinch roller pressing means, and said control means connects the power circuit sequentially to said reel mount shifting means driving means, to the cassette holder driving means, to the tape loading means driving means and to the pinch roller pressing means in a time sharing mode.

3. A tape cassette loading system for a magnetic recording and reproducing apparatus comprising:
    a cassette holder means for holding a tape cassette, capable of being moved between a cassette inserting position where a tape cassette is inserted therein and a cassette mounting position where a tape cassette is mounted on reel mounts;
    cassette holder driving means having a first motor means for driving the cassette holder means;
    tape loading driving means for driving a tape loading means for pulling a tape from a tape cassette mounted on the reel mounts, said tape loading driving means including a second motor means for driving said tape loading driving means;
    a reel mount shifting means for varying a distance between the reel mounts of a pair of reels, said reel mount shifting means including a third motor means for driving said reel mount shifting means;
    a single power circuit for supplying power to the cassette holder driving means, the tape loading driving means, and the reel mount shifting means; and
    control means for connecting the power circuit alternately to the first, the second and the third motor means in a time sharing mode.

4. A tape cassette loading system for a magnetic recording and reproducing apparatus, according to claim 3, further comprising:
    a pinch roller for pressing the tape wound around a rotary drum against a capstan; and
    pinch roller pressing means for pressing the pinch roller against the capstan;
    wherein said power circuit supplies power also to the pinch roller pressing means, and said control means connects said power circuit sequentially to said cassette holder driving means, to said tape loading driving means and to the pinch roller pressing means in a time sharing mode.

5. A tape cassette loading system for a magnetic recording and reproducing apparatus capable of operating with a plurality of kinds of tape cassettes differing from each other in the distance between the centers of a pair of reels contained therein for carrying a tape, comprising:
    a cassette holder for holding a tape cassette, capable of being moved between a cassette inserting position where a tape cassette is inserted therein and a cassette mounting position where a tape cassette is mounted on reel mounts:
    tape loading means for pulling out a tape from a tape cassette mounted on the reel mounts and winding the tape around a rotary drum;
    reel mount shifting means driving means for driving a reel mount shifting means for varying a distance between the centers of a pair of reel mounts according to the center distance between a pair of reels of a tape cassette to be used;
    cassette holder driving means for driving the cassette holder;
    tape loading means driving means for driving the tape loading means;
    a single power circuit for supplying power to the reel mount shifting means driving means, to the cassette holder driving means and to the tape loading means driving means; and
    control means for connecting the power circuit sequentially to the reel mount shifting means driving means, to the cassette holder driving means, and to the tape loading means driving means in a time sharing mode.

* * * * *